(12) United States Patent
Yabuuchi et al.

(10) Patent No.: US 8,991,202 B2
(45) Date of Patent: Mar. 31, 2015

(54) AIR-CONDITIONING HOT-WATER SUPPLY COMPLEX SYSTEM

(75) Inventors: Hironori Yabuuchi, Tokyo (JP); Junichi Kameyama, Tokyo (JP); Kosuke Tanaka, Tokyo (JP); Satoshi Akagi, Tokyo (JP)

(73) Assignee: Mitsubishi Electric Corporation, Chiyoda-Kum Tokyo (JP)

( * ) Notice: Subject to any disclaimer, the term of this patent is extended or adjusted under 35 U.S.C. 154(b) by 1098 days.

(21) Appl. No.: 12/811,641

(22) PCT Filed: Mar. 31, 2008

(86) PCT No.: PCT/JP2008/056287
§ 371 (c)(1),
(2), (4) Date: Jul. 2, 2010

(87) PCT Pub. No.: WO2009/122477
PCT Pub. Date: Oct. 8, 2009

(65) Prior Publication Data
US 2010/0282435 A1 Nov. 11, 2010

(51) Int. Cl.
*F25B 29/00* (2006.01)
*F25B 7/00* (2006.01)
(Continued)

(52) U.S. Cl.
CPC ............... *F25B 7/00* (2013.01); *F24D 17/0073* (2013.01); *F24D 17/02* (2013.01);
(Continued)

(58) Field of Classification Search
CPC ............... F25B 7/00; F25B 2313/0231; F25B 2313/0252; F25B 2313/0253; F25B 2313/0272; F24D 17/0073; F24D 17/02; F24D 19/1012

USPC ................... 62/238.1, 238.7, 468, 513, 196.1, 62/196.2, 196.3
See application file for complete search history.

(56) References Cited

U.S. PATENT DOCUMENTS 3,697,598 A * 10/1972 Weibull et al. ................. 564/477
5,694,780 A * 12/1997 Alsenz ............................ 62/117
(Continued)

FOREIGN PATENT DOCUMENTS

| JP | 1-277181 A | 11/1989 |
|---|---|---|
| JP | 4-263758 A | 9/1992 |

(Continued)

OTHER PUBLICATIONS

Dean, John A., Lange's Handbook of Chemistry, 2009, McGraw-Hill, Inc., Fifteenth Edition, Section, 11.26.*

(Continued)

*Primary Examiner* — Frantz Jules
*Assistant Examiner* — Brian King
(74) *Attorney, Agent, or Firm* — Buchanan Ingersoll & Rooney PC

(57) ABSTRACT

To provide an air-conditioning hot-water supply complex system that can simultaneously process a cooling load, a heating load, and a high-temperature hot-water supply load to provide a stable heat source all through the year. The air-conditioning hot-water supply complex system provides a bypass pipe in which a bypass electromagnetic valve is installed in parallel with a heating medium-refrigerant heat exchanger between a gateway of refrigerant piping of the heating medium-refrigerant heat exchanger to control an inflow amount of the refrigerant for hot-water supply to the heating medium-refrigerant heat exchanger by making the refrigerant for hot-water to flow into a bypass pipe by opening and closing the bypass electromagnetic valve.

3 Claims, 8 Drawing Sheets

(51) Int. Cl.
*F24D 17/00* (2006.01)
*F24D 17/02* (2006.01)
*F24D 19/10* (2006.01)
*F25B 13/00* (2006.01)
*F25B 49/02* (2006.01)

(52) U.S. Cl.
CPC ....... *F24D 19/1012* (2013.01); *F24D 19/1054* (2013.01); *F25B 13/00* (2013.01); *F25B 29/003* (2013.01); *F25B 49/027* (2013.01); *F25B 2313/0231* (2013.01); *F25B 2313/0252* (2013.01); *F25B 2313/0253* (2013.01); *F25B 2313/0272* (2013.01); *F25B 2313/02741* (2013.01); *F25B 2339/047* (2013.01); *F25B 2400/0403* (2013.01); *F25B 2400/13* (2013.01); *F25B 2600/0261* (2013.01); *F25B 2600/2501* (2013.01); *Y02B 30/12* (2013.01); *Y02B 30/745* (2013.01)
USPC ........................................................ 62/238.1

(56) References Cited

U.S. PATENT DOCUMENTS

| | | | |
|---|---|---|---|
| 2008/0245098 A1* | 10/2008 | Yamanaka et al. | 62/513 |
| 2010/0236263 A1* | 9/2010 | Park | 62/113 |

FOREIGN PATENT DOCUMENTS

| | | | | | |
|---|---|---|---|---|---|
| JP | 6-30673 | U | | 4/1994 | |
| JP | 08-261599 | | * | 10/1996 | ............. F25B 29/00 |
| JP | 8-261599 | A | | 10/1996 | |
| JP | 08261599 | A | * | 10/1996 | |
| JP | 11-270920 | A | | 10/1999 | |
| JP | 2004-132647 | A | * | 4/2004 | ............... F24H 1/00 |
| JP | 2004132647 | A | * | 4/2004 | |
| JP | 2004-293857 | A | | 10/2004 | |
| JP | 2004-293857 | A | * | 10/2004 | ............. F25B 47/02 |
| JP | 2004293857 | A | * | 10/2004 | |
| JP | 2007-192540 | A | | 8/2007 | |
| JP | 2008-070013 | A | | 3/2008 | |

OTHER PUBLICATIONS

Office Action (Notification of Reasons for Refusal) dated Feb. 7, 2012, issued in the corresponding Japanese Patent Application No. 2010-505139, and an English Translation thereof. (4 pages).
International Search Report (PCT/ISA/210) dated Jun. 17, 2008.
Office Action (Decision of Rejection) dated Jul. 3, 2012, issued by the Japanese Patent Office in corresponding Japanese Application No. 2010-505139, and an English Translation thereof. (3 pages).

* cited by examiner

FIG. 7
(a)
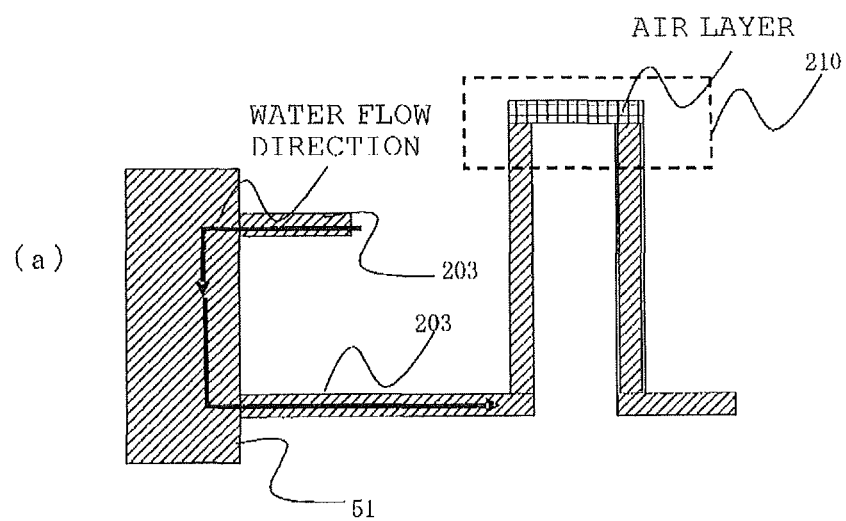
(b)
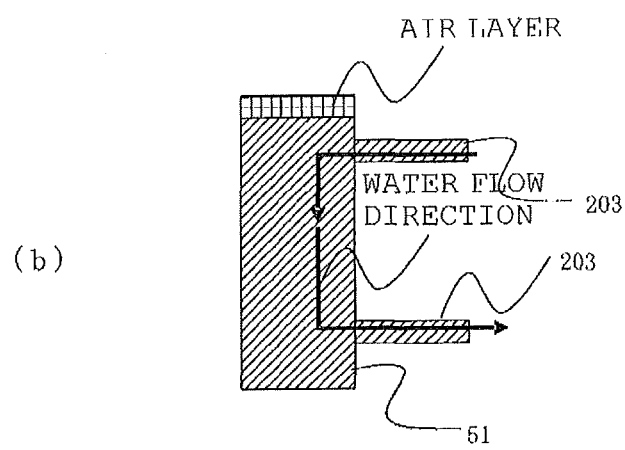

F I G. 8
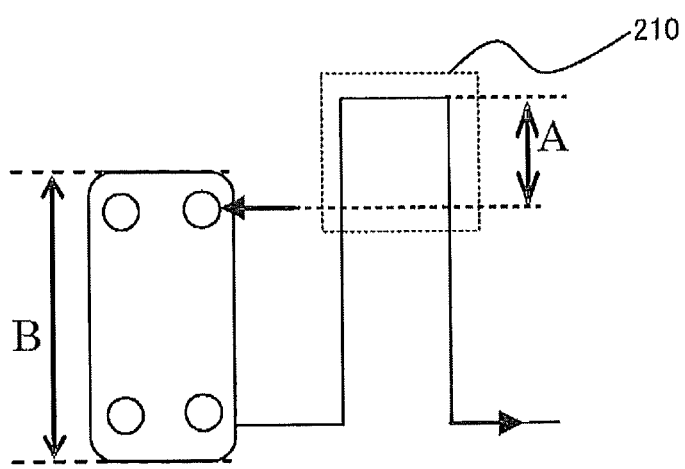

AIR-CONDITIONING HOT-WATER SUPPLY COMPLEX SYSTEM

TECHNICAL FIELD

The present invention relates to an air-conditioning hot-water supply complex system that is equipped with a heat pump cycle and can simultaneously provide a cooling load, a heating load, and a hot-water supply load.

BACKGROUND ART

Conventionally, the air-conditioning hot-water supply complex system exists that can simultaneously provide the cooling load, the heating load, and the hot-water supply load by a consolidated refrigeration cycle. As such, "a multifunction heat pump system that has a compressor, being composed of a refrigerant circuit in which the compressor, an outdoor heat exchanger, an indoor heat exchanger, a cold heat storage tank, and hot-water supply heat exchanger are connected, and configures a refrigeration cycle allowing an individual and a complex operations of cooling, heating, hot-water supply, heat storage, and cooling storage by switching a refrigerant flow to each heat exchanger" is proposed. (For example, see Patent Document 1)

The air-conditioning hot-water supply complex system exists that can simultaneously provide high-temperature hot-water supply and indoor air-conditioning function through a binary refrigeration cycle. As such, "a heat pump hot-water supply apparatus in which a first compressor, a refrigerant distributor, a first heat exchanger, a second heat exchanger, a first throttle device, an outdoor heat exchanger, a four-way valve, and the first compressor are connected according to this order, the four-way valve, the indoor heat exchanger, and the second throttle device are interposed according to this order from the refrigerant distributor to be connected between the second heat exchanger and the first throttle device, the refrigerant circuit at the low-stage side where the first refrigerant is made to flow, a second compressor, a condenser, a third throttle device, the first heat exchanger, and the second compressor are connected according to this order, the refrigerant circuit at the high-stage side where the second refrigerant is made to flow, the second heat exchanger, and the condenser are connected according to this order, and a hot-water supply passage where hot-water supply water is made to flow, are provided" is proposed. (For example, see Patent Document 2)

Patent Document 1 Japanese Unexamined Patent Application Publication No. H11-270920 (pages 3 to 4, FIG. 1)
Patent Document 2 Japanese Unexamined Patent Application Publication No. H4-263758 (pages 2 to 3, FIG. 1)

SUMMARY OF INVENTION

Problems to be Solved by the Invention

A multifunction heat pump system according to Patent Document 1 is adapted to provide a consolidated refrigerant cycle, that is, to simultaneously provide a cooling load, a heating load, and a hot-water supply load by a single refrigeration cycle. However, in such a system, since a temperature in a radiation process to heat water and the temperature in the radiation process to perform heating operation become almost the same, a high-temperature hot-water supply load cannot be covered at the time of the cooling operation. Therefore, there is a problem that heat cannot be stably supplied all through the year.

A heat pump system according to Patent Document 2 is adapted to provide a binary refrigerant cycle, that is, to simultaneously provide a cooling load, a heating load, and a hot-water supply load by two refrigeration cycles. However, in such a system, since the refrigerant circuit for air-conditioning in the indoor unit and that for hot-water supply are differently treated, no hot-water supply function can be simply added for a substitution for the indoor unit. Therefore, there is a problem that it cannot be introduced into an existing air-conditioning apparatus with ease.

The present invention is made to solve the above problems. The purpose of the present invention is to provide an air-conditioning hot-water supply complex system that is capable of processing the cooling load, the heating load, and the high-temperature hot-water supply load simultaneously and can supply a stable heat source all through the year.

Means for Solving the Problems

The air-conditioning hot-water supply complex system according to the present invention comprises;

a refrigeration cycle for air-conditioning having a first refrigerant circuit, in which a compressor for air-conditioning, flow path switching means, an outdoor heat exchanger, an indoor heat exchanger, and throttle means for air-conditioning are connected in series, in which a refrigerant-refrigerant heat exchanger and a throttle means for a hot-water supply heat source are connected in series and are connected with the indoor heat exchanger and the throttle means for air-conditioning in parallel, and in which a refrigerant for air-conditioning circulates;

a refrigeration cycle for hot-water supply having a second refrigerant circuit, in which a compressor for hot-water supply, a heating medium-refrigerant heat exchanger, throttle means for hot-water supply, and the refrigerant-refrigerant heat exchanger are connected in series, and in which a refrigerant for hot-water supply circulates;

a hot water supply load having a water circuit, in which a pump for water circulation, the heating medium-refrigerant heat exchanger, and a hot-water storage tank are connected in series, and in which water for hot-water supply circulates;

wherein the refrigeration cycle for air-conditioning and the refrigeration cycle for hot-water supply are cascaded so that the refrigerant for air-conditioning and the refrigerant for hot-water supply performs heat exchange in the refrigerant-refrigerant heat exchanger, the refrigeration cycle for hot-water supply and the hot-water supply load are cascaded so that the refrigerant for hot-water supply and the water perform heat exchange in the heating medium-refrigerant heat exchanger, a bypass pipe with a bypass electromagnetic valve is provided in parallel with the heating medium-refrigerant heat exchanger between a gateway of refrigerant piping connected with the heating medium-refrigerant heat exchanger, and an inflow amount of the refrigerant for hot-water supply to the heating medium-refrigerant heat exchanger is controlled by flowing the refrigerant for hot-water supply into the bypass pipe by opening and closing of the bypass electromagnetic valve.

Effect of the Invention

With the air-conditioning hot-water supply complex system according to the present invention, since a bypass pipe is provided in which a bypass electromagnetic valve is installed in parallel with the heating medium-refrigerant heat exchanger between an entrance and exit of a refrigerant side circuit in heating medium-refrigerant heat exchanger and an inflow amount of the hot-water supply refrigerant into the heating medium-refrigerant heat exchanger is controlled by flowing the hot-water supply refrigerant into the bypass pipe by opening and closing of the bypass electromagnetic valve, even when a defrost operation is in execution, no abrupt change in temperature occurs at a hot-water supply load side by flowing a low-pressure refrigerant into the bypass pipe, and a stable heat source can be supplied. By flowing the low-pressure refrigerant into the bypass pipe, water preserved in the heating medium-refrigerant heat exchanger can be prevented from freezing and damages to the heating medium-refrigerant heat exchanger can be prevented.

BRIEF DESCRIPTION OF DRAWINGS

FIG. 7 is an illustrative drawing for illustrating piping for hot-water storage water circulation according to Embodiment 3.

FIG. 8 is a schematic diagram illustrating the height of a trap.

Figure 1:
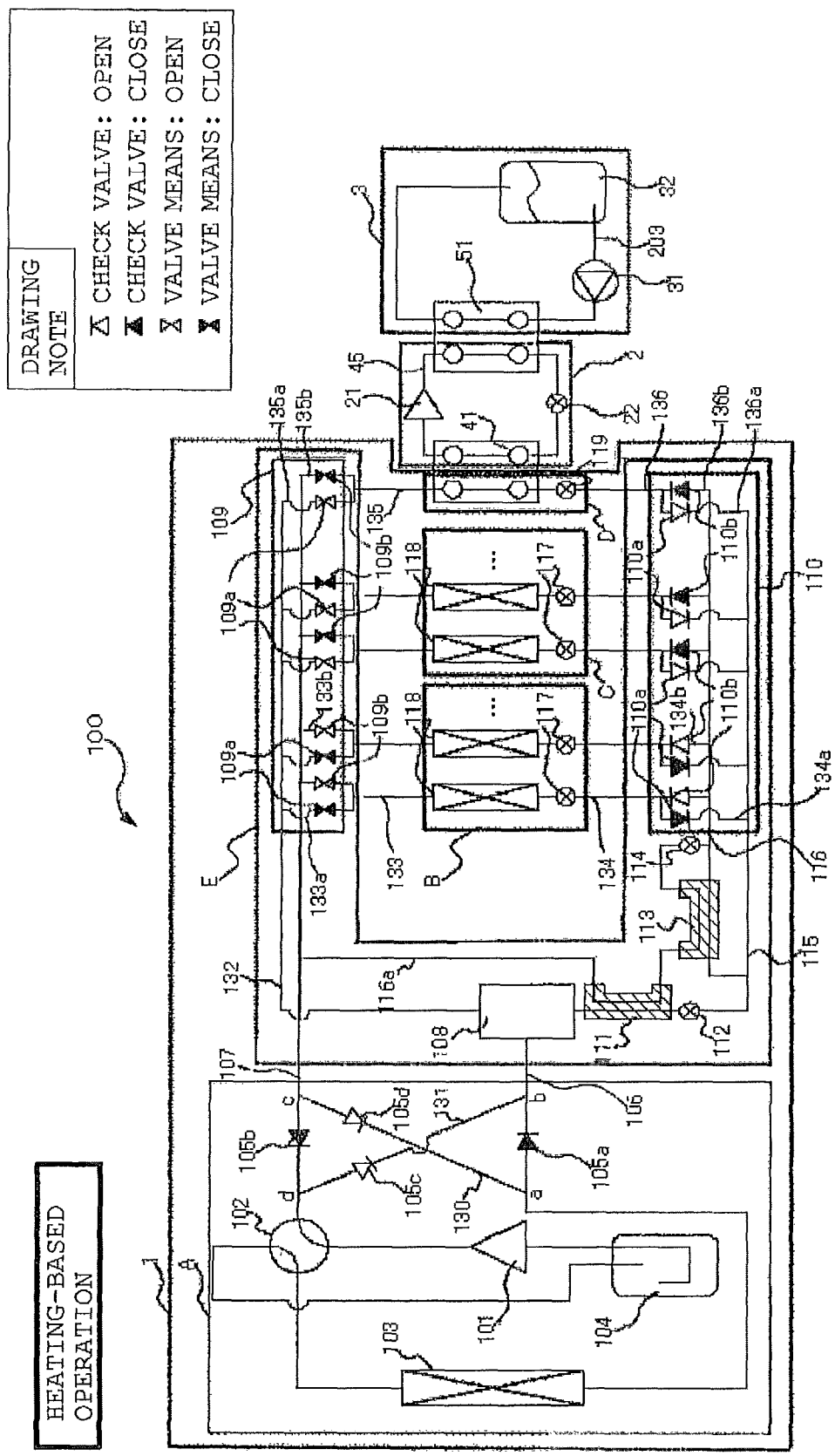
FIG. 1 is a refrigerant circuit diagram showing a refrigerant circuit configuration of an air-conditioning hot-water supply complex system according to Embodiment 1.

DESCRIPTIONS OF CODES AND SYMBOLS 1 refrigeration cycle for air-conditioning
2 refrigeration cycle for hot-water supply
2a refrigeration cycle for hot-water supply
3 hot-water supply load
4 hot-water supply water circulation cycle
21 compressor for hot-water supply
22 throttle means for hot-water supply
31 water circulation pump
31a heating medium circulation pump
32 hot-water storage tank
41 refrigerant-refrigerant heat exchanger
45 refrigerant piping
45a bypass pipe
51 heating medium-refrigerant heat exchanger
51a heating medium-refrigerant heat exchanger
100 air-conditioning hot-water supply complex system
101 compressor for air-conditioning
102 four-way valve
103 outdoor heat exchanger
103a divided heat exchanger
104 accumulator
105a, 105b, 105c, 105d check valve
106 high-pressure side connection piping
107 low-pressure side connection piping
108 gas-liquid separator
109 distribution part
109a, 109b valve means
110 distribution part
110a, 110b check valve
111 internal heat exchanger
112 first relay throttle means
113 internal heat exchanger
114 second relay throttle means
115, 116, 116a meeting part
117 throttle means for air-conditioning
118 indoor heat exchanger
119 throttle means for hot-water supply heat source
130, 131, 132, 133, 133a, 133b, 134, 134a, 134b, 135, 135a, 135b, 136, 136a, 136b connection piping
201 water-water heat exchanger
202 piping for circulating water
203, 203a piping for hot-water storage water circulation
209 electromagnetic valve (opening closing valve)
209a electromagnetic valve (bypass opening closing valve)
210 trap
300 bypass circuit
309 bypass electromagnetic valve
A heat source unit
B cooling indoor unit
C heating indoor unit
D hot-water supply heat source circuit
E relay
a, b, c, d connection part

DESCRIPTION OF THE PREFERRED EMBODIMENTS

Descriptions will be given to embodiments of the present invention based on drawings.

Embodiment 1

FIG. 1 is a refrigerant circuit diagram showing a refrigerant circuit configuration (especially, a refrigerant circuit configuration at the time of heating-based operation) of an air-conditioning hot-water supply complex system 100 according to Embodiment 1 of the present invention. Based on FIG. 1, a refrigerant circuit configuration of the air-conditioning hot-water supply complex system 100, especially the refrigerant circuit configuration at the time of the heating-based operation will be explained. The air-conditioning hot-water supply complex system 100 is installed in the building, condo, and the like and simultaneously supplies a cooling load, a heating load, and a hot-water supply load utilizing a refrigeration cycle (heat pump cycle) circulating a refrigerant (refrigerant for air-conditioning). With drawings as follows including FIG. 1, relations of dimensions of each component member may differ from an actual member.

The air-conditioning hot-water supply complex system 100 according to Embodiment 1 is composed of a refrigeration cycle for air-conditioning 1, a refrigeration cycle for hot-water supply 2, and a hot-water supply load 3. It is configured that the refrigeration cycle for air-conditioning 1 and the refrigeration cycle for hot-water supply 2 perform heat exchange in the refrigerant-refrigerant heat exchanger 41 and the a refrigeration cycle for hot-water supply 2 and a hot-water supply load 3 perform heat exchange in the heating medium-refrigerant heat exchanger 51 respectively without mixing each refrigerant and water. In FIG. 1, in the refrigeration cycle for air-conditioning 1, a load for the cooling indoor unit B is smaller than a total load for the heating indoor unit C and hot-water supply heat source circuit D, and a cycle condition (for convenience, called a heating-based operation) is shown when the outdoor heat exchanger 103 functions as an evaporator.

[Refrigeration Cycle for Air-Conditioning 1]

The refrigeration cycle for air-conditioning 1 is composed of a heat source unit A, a cooling indoor unit B in charge of the cooling load, a heating indoor unit C in charge of the heating load, a hot-water supply heat source circuit D to be a heat source of the refrigeration cycle for hot-water supply 2, and a relay E. Among them, the cooling indoor unit B, the heating indoor unit C, and the hot-water supply heat source circuit D are connected to be in parallel with the heat source unit A and mounted. Then, by switching the refrigerant flow by the relay E, which is located among the heat source unit A, the cooling indoor unit B, the heating indoor unit C, and the hot-water supply heat source circuit D, the cycle is adapted to exhibit its function as the cooling indoor unit B, the heating indoor unit C, and the hot-water supply heat source circuit D.

[Heat Source Unit A]

The heat source unit A is configured by connecting the compressor for air-conditioning 101, the four-way valve 102 which is flow path switching means, the outdoor heat exchanger 103, and the accumulator 104 in series. The heat source unit A has a function to supply the cooling indoor unit B, the heating indoor unit C, and the hot-water supply heat source circuit D with cold heat. In the vicinity of the outdoor heat exchanger 103, a blower such as a fan may be installed to supply air thereto. Also, in the heat source unit A, a check valve 105a for allowing a refrigerant flow for air-conditioning only in a predetermined direction (in the direction from the heat source unit A to the relay E) in high-pressure side connection piping 106 between the outdoor heat exchanger 103 and the relay E, and a check valve 105b for allowing a refrigerant flow for air-conditioning only in a predetermined direction (in the direction from the relay E to the heat source unit A) in low-pressure side connection piping 107 between the four-way valve 102 and the relay E are provided, respectively.

The high-pressure side connection piping 106 and the low-pressure side connection piping 107 are connected with a first connection piping 130 connecting the upstream sides of the check valves 105a and 105b and a second connection piping 131 connecting the downstream sides of the check valves 105a and 105b. That is, a connection part a of the high-pressure side connection piping 106 and the first connection piping 130 is an upstream side of a connection part b of the high-pressure side connection piping 106 and the second connection piping 131 with the check valve 105 being between them. A connection part c of the low-pressure side connection piping 107 and the first connection piping 130 is an upstream side of a connection part d of the low-pressure side connection piping 107 and the second connection piping 131 with the check valve 105b being between them.

In the first connection piping 130, a check valve 105c is provided to allow the refrigerant flow for air-conditioning only in the direction from the low-pressure side connection piping 107 to the high-pressure side connection piping 106. In the second connection piping 131, a check valve 105d is provided to allow the refrigerant flow for air-conditioning only in the direction from the low-pressure side connection piping 107 to the high-pressure side connection piping 106. In FIG. 1, the refrigerant circuit configuration at the time of the heating-based operation is shown, so that the check valves 105a and 105b are closed (denoted in black) and check valves 105b and 105c are open (denoted in white).

The compressor for air-conditioning 101 sucks and compresses a refrigerant for air-conditioning to turn it into a high-temperature high-pressure condition. The four-way valve 102 switches a refrigerant flow for air-conditioning. The outdoor heat exchanger 103 functions as an evaporator and a radiator (condenser) and performs heat exchange between air supplied from a blower, not shown, and the refrigerant for air-conditioning to evaporation-gasify or condensation-liquefy the refrigerant for air-conditioning. The accumulator 104 is disposed between the four-way valve 102 and the compressor for air-conditioning 101 to store a surplus refrigerant for air-conditioning at the time of the heating-based operation. The accumulator 104 may be any container capable of storing a surplus refrigerant for air-conditioning.

[Cooling Indoor Unit B and Heating Indoor Unit C]

In the cooling indoor unit B and the heating indoor unit C, the throttle means for air-conditioning 117 and indoor heat exchanger 118 are connected and mounted in series. Also, the cooling indoor unit B and the heating indoor unit C are shown in the case in which two throttle means for air-conditioning 117 and two indoor heat exchangers 118 are mounted in parallel respectively as an example. The cooling indoor units B has a function to be supplied cold heat from the heat source unit A to be in charge of the cooling load. The heating indoor units C has a function to be supplied cold heat from the heat source unit A to be in charge of the heating load.

That is, in Embodiment 1, a condition is shown in which the relay E determines that the cooling indoor units B is in charge of the cooling load and the heating indoor unit C is in charge of the heating load. In the vicinity of the indoor heat exchanger 118, a blower such as a fan may be installed that supplies the indoor heat exchanger 118 with air. For convenience, descriptions will be given by denoting connection piping connecting from the relay F to the indoor heat exchanger 118 as connection piping 133, and connection piping connecting from the relay E to the throttle means for air-conditioning 117 as connection piping 134.

The throttle means for air-conditioning 117 functions as a decompression valve and an expansion valve to decompress and expand the refrigerant for air-conditioning. The throttle means for air-conditioning 117 may be composed of opening-degree variably controllable means such as precise flow amount control means by an electronic expansion valve and inexpensive refrigerant flow amount adjusting means such as a capillary tube. The indoor heat exchanger 118 functions as a radiator (condenser) and an evaporator and perform heat exchange between air supplied from blowing means, not shown, and the refrigerant for air-conditioning to condensation-liquefy or evaporation-gasify the refrigerant for air-conditioning. The throttle means for air-conditioning 117 and the indoor heat exchanger 118 are connected in series.

[Hot-Water Supply Heat Source Circuit D]

In the hot-water supply heat source circuit D, the throttle means for hot-water supply heat source 119 and the refrigerant-refrigerant heat exchanger 41 are serially connected and a function is provided to supply cold heat from the heat source unit A via the refrigerant-refrigerant heat exchanger 41 to the refrigeration cycle for hot-water supply 2. That is, the refrigeration cycle for air-conditioning 1 and the refrigeration cycle for hot-water supply 2 are cascaded by the refrigerant-refrigerant heat exchanger 41. For convenience, descriptions will be given by denoting connection piping connecting from the relay E to the refrigerant-refrigerant heat exchanger 41 as connection piping 135, and connection piping connecting from the relay E to the throttle means for hot-water supply heat source 119 as connection piping 136.

Like throttle means for air-conditioning 117, the throttle means for hot-water supply heat source 119 functions as a decompression valve and an expansion valve to decompress and expand the refrigerant for air-conditioning. The throttle means for hot-water supply heat source 119 may be composed of opening-degree variably controllable means such as precise flow amount control means by an electronic expansion valve and inexpensive refrigerant flow amount adjusting means such as a capillary tube. The refrigerant-refrigerant heat exchanger 41 functions as a radiator (condenser) and an evaporator and is adapted to perform heat exchange between the refrigerant for hot-water supply circulating the refrigeration cycle of the refrigeration cycle for hot-water supply 2 and the refrigerant for air-conditioning circulating the refrigeration cycle of the refrigeration cycle for air-conditioning 1.

[Relay E]

The relay E has a function to connect each of the cooling indoor unit B, the heating indoor unit C, and the hot-water supply heat source circuit D and the heat source unit A, and at the same time, has a function to determine whether the indoor heat exchanger 118 be a radiator or an evaporator, and whether the refrigerant-refrigerant heat exchanger 41 be a water cooler or a water heater by alternatively opening and closing any of valve means 109a or valve means 109b of the first distribution part 109.

The relay E is composed of the gas-liquid separator 108, the first distribution part 109, the second distribution part 110, the first internal heat exchanger 111, the first relay throttle means 112, the second internal heat exchanger 113, and the second relay throttle means 114.

In the first distribution part 109, connection piping 133 and connection piping 135 are branched into two, while one (connection piping 133b and connection piping 135b) being adapted to be connected with low-pressure side connection piping 107, the other (connection piping 133a and connection piping 135a) being connected with connection piping (called connection piping 132) connected with the gas-liquid separator 108. In the first distribution part 109, valve means 109a that does flow or does not flow the refrigerant into connection piping 133a and 135a by an opening closing control, and valve means 109b that does flow or does not flow the refrigerant into connection piping 133b and 135b by the opening closing control are provided respectively. The opening closing conditions of the valve means 109a and 109b are denoted by white (open) and black (closed), respectively.

In the second distribution part 110, connection piping 134 and connection piping 136 are branched into two, while one (connection piping 134a and connection piping 136a) being adapted to be connected at the first meeting part 115, the other (connection piping 134b and connection piping 136b) being adapted to be connected at the second meeting part 116. Also, in the second distribution part 110, the check valve 110a that allows the refrigerant to flow through either connection piping 134a or 136a, and the check valve 110b that allows the refrigerant to flow through either connection piping 134b or 136b, are provided respectively. The opening closing conditions of the check valves 110a and 110b are denoted by white (open) and black (closed), respectively.

The first meeting part 115 connects the second distribution part 110 with the gas-liquid separator 108 via the first relay throttle means 112 and the first internal heat exchanger 111. The second meeting part 116 branches between the second distribution part 110 and the second internal heat exchanger 113, while one being connected with the first meeting part 115 between the second distribution part 110 and the first relay throttle means 112 via the second internal heat exchanger 113, the other (the second meeting part 116a) being connected with the low-pressure side connection piping 107 via the second relay throttle means 114, the second internal heat exchanger 113, and the first internal heat exchanger 111.

The gas-liquid separator 108 separates the refrigerant for air-conditioning into a gas refrigerant and a liquid refrigerant, and is provided in the high-pressure side connection piping 106, while one being connected with the valve means 109a of the first distribution part 109, the other being connected with the second distribution part 110 via the first meeting part 115. The first distribution part 109 has a function to flow the refrigerant for air-conditioning into the indoor heat exchanger 118 and the refrigerant-refrigerant heat exchanger 41 with either of the valve means 109a or 109b being alternatively opened or closed. The second distribution part 110 has a function to allow the refrigerant for air-conditioning to flow in either direction by the check valves 110a and 110b.

The first internal heat exchanger 111 is provided in the first meeting part 115 between the gas-liquid separator 108 and the first relay throttle means 112 to perform heat exchange between the refrigerant for air-conditioning flowing through the first meeting part 115 and the refrigerant for air-conditioning flowing through the second meeting part 116a branched from the second meeting part 116. The first relay throttle means 112 is provided in the first meeting part 115 between the first internal heat exchanger 111 and the second distribution part 110 to decompress and expand the refrigerant for air-conditioning. The first relay throttle means 112 may be composed of opening-degree variably controllable means such as precise flow amount control means by an electronic expansion valve and inexpensive refrigerant flow amount adjusting means such as a capillary tube.

The second internal heat exchanger 113 is provided at the second meeting part 116 to perform heat exchange between the refrigerant for air-conditioning flowing through the second meeting part 116 and the refrigerant for air-conditioning flowing through the second meeting part 116a branched from the second meeting part 116. The second relay throttle means 114 is provided at the second meeting part 116 between the second internal heat exchanger 113 and the second distribution part 110 to function as a decompress valve and an expansion valve to decompress and expand the refrigerant for air-conditioning. The second relay throttle means 114 may be composed of opening-degree variably controllable means such as precise flow amount control means by an electronic expansion valve and inexpensive refrigerant flow amount adjusting means such as a capillary tube.

As mentioned above, with the refrigeration cycle for air-conditioning 1, the compressor for air-conditioning 101, the four-way valve 102, the indoor heat exchanger 118, the throttle means for air-conditioning 117, and the outdoor heat exchanger 103 are connected in series, and the compressor for air-conditioning 101, the four-way valve 102, the refrigerant-refrigerant heat exchanger 41, the throttle means for hot-water supply heat source 119, and the outdoor heat exchanger 103 are connected in series, the indoor heat exchanger 118 and the refrigerant-refrigerant heat exchanger 41 are connected in parallel via the relay E to configure the first refrigerant circuit. The refrigeration cycle for air-conditioning 1 is realized by flowing the refrigerant for air-conditioning into the first refrigerant circuit.

The compressor for air-conditioning 101 may be any type that can compress the sucked refrigerant into a high-pressure state with no limit in particular. For example, various types such as reciprocal, rotary, scroll, or screw can be utilized to constitute the compressor for air-conditioning 101. The compressor for air-conditioning 101 may be a rotation-speed variably controllable type by an inverter or a rotation-speed fixed type. The kind of the refrigerant circulating in the refrigeration cycle for air-conditioning 1 is not limited in particular. Any kind of natural refrigerant such as carbon dioxide ($CO_2$), hydrocarbon, helium, alternative refrigerant without chlorine such as HFC410A and HFC407C, or fluorocarbon refrigerant such as R22 and R134a used in existing products, may be used.

Here, descriptions will be given to the heating-based operation of the refrigeration cycle for air-conditioning 1. The refrigerant turned into high-temperature high-pressure conditions in the compressor for air-conditioning 101 is discharged from the compressor for air-conditioning 101 flows through the check valve 105c via the four-way valve 102 to be introduced into the high-pressure side connection piping 106 to flow into the gas-liquid separator 108 of the relay E under an overheat gas condition. The refrigerant for air-conditioning under the overheat gas condition flowed into the gas-liquid separator 108 is distributed into a circuit where valve means 109a of the first distribution part 109 is open. Here, the refrigerant for air-conditioning under the overheat gas condition is adapted to flow into the heating indoor unit c and the hot-water supply heat source circuit D.

The refrigerant for air-conditioning flowed into the heating indoor unit c releases heat in the indoor heat exchanger 118 (that is, heats the indoor air) and is decompressed by the throttle means for air-conditioning 117 to merge at the meeting part 115. The refrigerant for air-conditioning flowed into the hot-water supply heat source circuit D releases heat in the refrigerant-refrigerant heat exchanger 41 (that is, provide the refrigeration cycle for hot-water supply 2 with heat) and is decompressed by the throttle means for hot-water supply heat source 119 to merge with the refrigerant for air-conditioning flowed out of the heating indoor unit C. On the other hand, part of the refrigerant for air-conditioning under the overheat gas condition flowed into the gas-liquid separator 108 obtains super-cooling degree by performing heat exchange with the refrigerant for air-conditioning which is expanded to be low-temperature low-pressure by the second relay throttle means in the internal heat exchanger 111.

Thereafter, the refrigerant passes through the first relay throttle means 112 to merge with the refrigerant for air-conditioning used for air-conditioning (the refrigerant for air-conditioning flowed into the heating indoor unit C and the hot-water supply heat source circuit D to release heat at the indoor heat exchanger 118 and the refrigerant-refrigerant heat exchanger 41) at the first meeting part 115. The refrigerant for air-conditioning passing through the first relay throttle means 112 that is partly under the overheat gas condition may be nothing by fully opening the first relay throttle means 112. Then, super-cooling degree can be obtained by performing heat exchange with the expanded refrigerant for air-conditioning to be low-temperature low-pressure by the second relay throttle means 114 in the internal heat exchanger 113. The refrigerant for air-conditioning is distributed into the second meeting part 116 side and the second relay throttle means 114 side 114.

The refrigerant for air-conditioning flowing through the second meeting part 116 is distributed into the circuit where the valve means 109b is open. Here, the refrigerant for air-conditioning flowing through the second meeting part 116 flows into the cooling indoor unit B, expanded to be low-temperature low-pressure by the throttle means for air-conditioning 117, evaporates in the indoor heat exchanger 110, and merged at the low-pressure side connection piping 107 via the valve means 109b. The refrigerant for air-conditioning flowed through the second relay throttle means 114 performs heat exchange in the internal heat exchanger 113 and the first internal heat exchanger 111 to evaporate, and merges with the refrigerant for air-conditioning flowed out of the cooling indoor unit B in the low-pressure side connection piping 107.

The refrigerant for air-conditioning merged in the low-pressure side connection piping 107 is guided into the outdoor heat exchanger 103 via the check valve 105d, evaporates a remaining liquid refrigerant according to operation conditions, and returns to the compressor for air-conditioning 101 via the four-way valve 102 and accumulator 104.

[Refrigeration Cycle for Hot-Water Supply 2]

The Refrigeration cycle for hot-water supply 2 is composed of the compressor for hot-water supply 21, the heating medium-refrigerant heat exchanger 51, the throttle means for hot-water supply 22, and the refrigerant-refrigerant heat exchanger 41. That is, with the refrigeration cycle for hot-water supply 2, a second refrigeration circuit is configured by connecting the compressor for hot-water supply 21, the heating medium-refrigerant heat exchanger 51, the throttle means for hot-water supply 22, and the refrigerant-refrigerant heat exchanger 41 in series with refrigeration piping 45. The refrigeration cycle for hot-water supply is constituted by the circulating refrigerant for hot-water supply in the second refrigeration circuit. The operation of the refrigeration cycle for hot-water supply 2 does not differ according to operation conditions of the refrigeration cycle for air-conditioning 1, that is, whether a cooling-based operation or heating-based operation is in execution.

The compressor for hot-water supply 21 sucks the refrigerant for hot-water supply to compress and turn it into high-temperature high-pressure conditions. The compressor for hot-water supply 21 may be configured to be a rotation-speed variably controllable type by an inverter or may be a rotation-speed fixed type. The compressor for hot-water supply 21 may be any type that can compress the sucked refrigerant into a high-pressure state with no limit in particular type. For example, various types such as reciprocal, rotary, scroll, or screw can be utilized to constitute the compressor for hot-water supply 21.

The heating medium-refrigerant heat exchanger 51 performs heat exchange between the water (heating medium) circulating in the hot-water supply load 3 and the refrigerant for hot-water supply circulating in the refrigeration cycle for hot-water supply 2. That is, the refrigeration cycle for hot-water supply 2 and the hot-water supply load 3 are cascaded by the heating medium-refrigerant heat exchanger 51. The throttle means for hot-water supply 22 functions as a decompress valve and an expansion valve to decompress and expand the refrigerant for hot-water supply. The throttle means for hot-water supply 22 may be composed of opening-degree variably controllable means such as precise flow amount control means by an electronic expansion valve and inexpensive refrigerant flow amount adjusting means such as a capillary tube.

The refrigerant-refrigerant heat exchanger 41 performs heat exchange between the refrigeration for hot-water supply circulating in the refrigeration cycle for hot-water supply 2 and the refrigerant for air-conditioning circulating the refrigeration cycle for air-conditioning 1. The kind of the refrigerant circulating in the refrigeration cycle for hot-water supply 2 is not limited in particular. Any kind may be used such as carbon dioxide ($CO_2$), hydrocarbon, natural refrigerant such as helium, alternative refrigerant without chlorine such as HFC410A, HFC407C and HFC404A, or fluorocarbon refrigerant such as R22 and R134a used in existing products.

Here, descriptions will be given to the operation of the refrigeration cycle for hot-water supply 2. The refrigerant for hot-water supply turned into high-temperature high-pressure in the compressor for hot-water supply 21 is discharged from the compressor for compressor for hot-water supply 21 to flow into the heating medium-refrigerant heat exchanger 51.

In the heating medium-refrigerant heat exchanger 51, the inflow refrigerant for hot-water supply releases heat by heating the water circulating in the hot-water supply load 3. The refrigerant for hot-water supply is expanded by the throttle means for hot-water supply 22 below an outlet temperature of the refrigerant-refrigerant heat exchanger 41 in the hot-water supply heat source circuit D of the refrigeration cycle for air-conditioning 1. The expanded refrigerant for hot-water supply receives heat from the refrigerant for air-conditioning flowing in the hot-water supply heat source circuit D constituting the refrigeration cycle for air-conditioning 1 in the refrigerant-refrigerant heat exchanger 41 to evaporate and returns to the compressor for hot-water supply 21.

[Hot-Water Supply Load 3]

The hot-water supply load 3 is composed of the water circulation pump 31, the heating medium-refrigerant heat exchanger 51, and the hot-water storage tank 32. That is, the hot-water supply load 3 configures a water circuit (heating medium circuit) by connecting the water circulation pump 31, the heating medium-refrigerant heat exchanger 51, and the hot-water storage tank 32 in series with piping for hot-water storage water circulation 203 to be constituted by circulating water for hot-water supply in the water circuit. The operation of the hot-water supply load 3 does not differ according to operation conditions of the refrigeration cycle for air-conditioning 1, that is, whether a cooling-based operation or heating-based operation is in execution. The piping for hot-water storage water circulation 203 constituting the water circuit is composed of such as a copper tube, a stainless tube, a steel tube, and vinyl chloride piping.

The water circulation pump 31 sucks water stored in the hot-water storage tank 32 to pressurize and circulate the water in the hot-water supply load 3 and may be composed of a type whose rotation speed is controlled by the inverter. The heating medium-refrigerant heat exchanger 51, as mentioned above, performs heat exchange between the water (heating medium) circulating in the hot-water supply load 3 and the refrigerant for hot-water supply circulating in the refrigeration cycle for hot-water supply 2. The hot-water storage tank 32 stores the water heated by the heating medium-refrigerant heat exchanger 51.

The relatively low-temperature water stored in the hot-water storage tank 32 is drawn out of the bottom part of the hot-water storage tank 32 by the water circulation pump 31 to be pressurized. The pressurized water by the water circulation pump 31 flows into the heating medium-refrigerant heat exchanger 51 to receive heat from the refrigerant for hot-water supply circulating in the refrigeration cycle for hot-water supply 2 in the heating medium-refrigerant heat exchanger 51. That is, the water flowed into the heating medium-refrigerant heat exchanger 51 is boiled by the refrigerant for hot-water supply circulating in the refrigeration cycle for hot-water supply 2 to increase its temperature. Then, the boiled water returns to the relatively high-temperature upper part of the hot-water storage tank 32 to be stored in the hot-water storage tank 32.

Since the refrigeration cycle for air-conditioning 1 and the refrigeration cycle for hot-water supply 2 are, as mentioned above, an independent refrigerant circuit configuration (a first refrigerant circuit constituting the refrigeration cycle for air-conditioning 1 and a second refrigerant circuit constituting the refrigeration cycle for hot-water supply 2), the refrigerant circulating in each refrigerant circuit may be the same kind or a different kind. That is, the refrigerant in each refrigerant circuit flows so as to perform heat exchange with each other in the refrigerant-refrigerant heat exchanger 41 and the heating medium-refrigerant heat exchanger 51 without being mixed, respectively.

In the use of the refrigerant whose critical temperature is low as the refrigerant for hot-water supply, the refrigerant for hot-water supply is supposed to become a super-critical state in the heat dissipation process in the heating medium-refrigerant heat exchanger 51 when high-temperature hot-water is supplied. However, in general, when the refrigerant in the heat dissipation process is in the super-critical state, variations of the COP is large due to changes in the pressure and the outlet temperature of the radiator, therefore, more sophisticated control is required to perform operation capable of obtaining high COP. On the other hand, the refrigerant having a low critical temperature has a high saturation pressure for the same temperature, and a thicker piping and compressor is required, resulting increase in cost.

Considering that a recommendation temperature for water stored in the hot-water storage tank 32 for suppressing reproduction of the *Legionella* bacteria is 60° C. or over, a target temperature for hot-water supply is supposed to be at least 60° C. or over in many cases. Based on the above, a refrigerant having a critical temperature of at least 60° C. or over is adopted for hot-water supply. It is because more stable and higher COP can be obtained at a lower cost by adopting such a refrigerant as the refrigerant for hot-water supply of the refrigeration cycle for hot-water supply 2. When regularly employing a refrigerant at the vicinity of the critical temperature, since in the refrigerant circuit, it is supposed to become high-temperature and high-pressure, a stable operation for the compressor for hot-water supply 21 can be achieved using a compressor of a type employing a high-pressure shell.

An example is shown in which a surplus refrigerant is stored by a receiver (accumulator 104) in the refrigeration cycle for air-conditioning 1, however, it is not limited thereto. The accumulator 104 can be removed if it is stored in a heat exchanger, which is a radiator in the refrigeration cycle. In FIG. 1, an example is shown in which two or more cooling indoor units B and heating indoor units C are connected, however, the number of connected units is not limited in particular. For example, it may be allowable when at least one cooling indoor unit B and no or at least one heating indoor unit C are connected. Each capacity of each indoor unit constituting the refrigeration cycle for air-conditioning 1 may be the same, and may be different raging from large to small capacities.

As described above, in the air-conditioning hot-water supply complex system 100 according to Embodiment 1, since a hot-water supply load system is composed of a binary cycle, when providing a high-temperature hot-water supply demand (for example, 80° C.), the temperature of the radiator of the refrigeration cycle for hot-water supply 2 may be made to be a high temperature (for example, a condensation temperature of 85° C.). Therefore, when there are other heating loads, no increase in a condensation temperature (for example, 50° C.) of the heating indoor unit C is required, resulting in energy saving. For example, when a high-temperature hot-water supply demand arises in the air-conditioning cooling operation during summertime, it used to be necessary to provide it using such as a boiler. However, heat, which was discharged into the atmosphere before, is collected and reused to supply hot-water, therefore, a system COP is significantly improved to promote energy saving.

Figure 2:
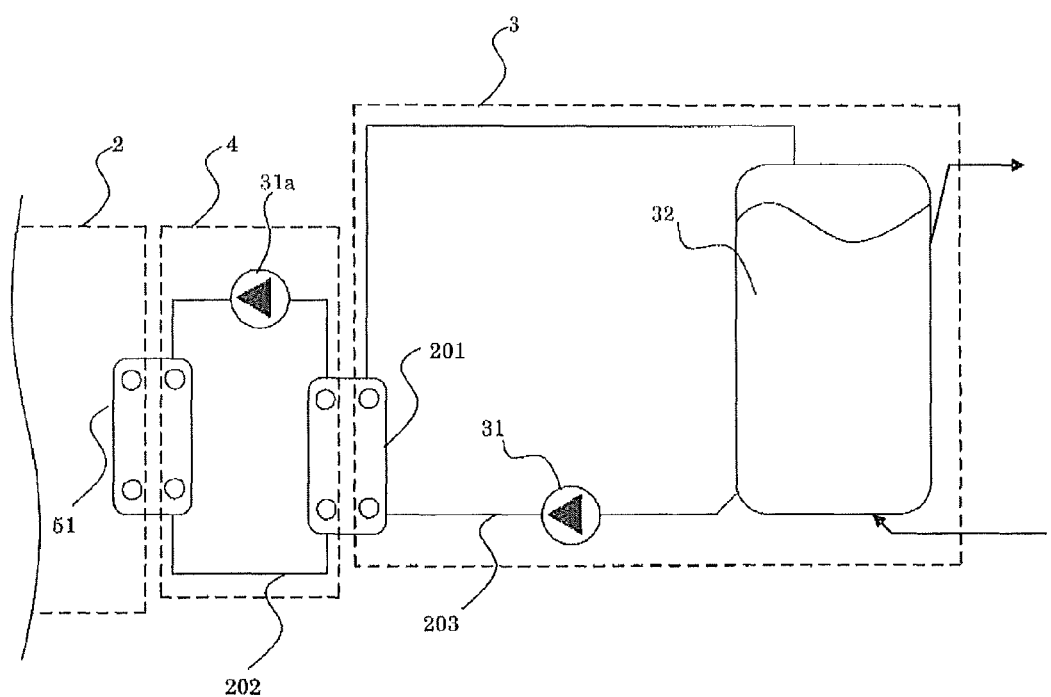
FIG. 2 is a schematic circuit configuration diagram illustrating another embodiment of a hot-water supply load.

FIG. 2 is a schematic circuit configuration diagram illustrating another embodiment of a hot-water supply load 3. Based on FIG. 2, descriptions will be given to an example for a mechanism to heat the circulating water as another embodiment of the hot-water supply load 3. As shown in FIG. 2, between the refrigeration cycle for hot-water supply 2 and the hot-water supply load 3, the hot-water supply water circulation cycle (hot-water supply heating medium circulation cycle) 4 is cascaded via the heating medium-refrigerant heat exchanger 51 and the water-water heat exchanger (heating medium-heating medium heat exchanger) 201. In FIG. 1, the hot-water supply load 3 constituted as an open circuit is exemplified by a case in which water is directly heated by the heating medium-refrigerant heat exchanger 51. In FIG. 2, the hot-water supply load 3 constituted as an open circuit is exemplified by a case in which the hot-water supply water circulation cycle 4 is provided between the hot-water supply load 3 and the refrigeration cycle for hot-water supply 2 and water is indirectly heated by the water-water heat exchanger 201.

[Hot-Water Supply Water Circulation Cycle 4]

The hot-water supply water circulation cycle 4 is composed of the heating medium circulation pump 31a, the heating medium-refrigerant heat exchanger 51, and water-water heat exchanger 201. That is, the hot-water supply water circulation cycle 4 configures a water circuit (heating medium circuit) by connecting the heating medium circulation pump 31a, the heating medium-refrigerant heat exchanger 51, and the water-water heat exchanger 201 in series by piping for circulating water 202 and constituted by circulating heating medium for heating (water for heating) in the heating medium circuit (water circuit). The piping for circulating water 202 constituting the water circuit is composed of such as a copper tube, a stainless tube, a steel tube, and vinyl chloride piping.

The heating medium circulation pump 31a sucks water (heating medium) flowing through the piping for circulating water 202 and pressurizes the water to circulate in the hot-water supply water circulation cycle 4, and may be composed of a type whose rotation speed is controlled by the inverter for example. The heating medium-refrigerant heat exchanger 51 performs heat exchange between the water circulating in the hot-water supply water circulation cycle 4 and the refrigerant for hot-water supply circulating in the refrigeration cycle for hot-water supply 2. The water-water heat exchanger 201 performs heat exchange between the water circulating in the hot-water supply water circulation cycle 4 and the water circulating the hot-water supply load 3. The case will be explained in which the water is circulated in the hot-water supply water circulation cycle 4 as an example, however, other fluids such as brine (antifreeze liquid) may be circulated as a heating medium.

The relatively low-temperature water stored in the hot-water storage tank 32 is drawn out of the bottom part of the hot-water storage tank 32 by the water circulation pump 31 to be pressurized. The pressurized water by the water circulation pump 31 flows into the water-water heat exchanger 201 to receive heat from the water circulating in the hot-water supply water circulation cycle 4 in the water-water heat exchanger 201. That is, the water flowed into the water-water heat exchanger 201 is boiled by the water circulating in the hot-water supply water circulation cycle 4 to increase the temperature. Then, the boiled water returns to the relatively high-temperature upper part of the hot-water storage tank 32 to be stored in the hot-water storage tank 32. That is, the heat from the refrigeration cycle for hot-water supply 2 is adapted to be transferred to the hot-water supply water circulation cycle 4 in the heating medium-refrigerant heat exchanger 51 and to the hot-water supply load 3 in the water-water heat exchanger 201.

Figure 3:
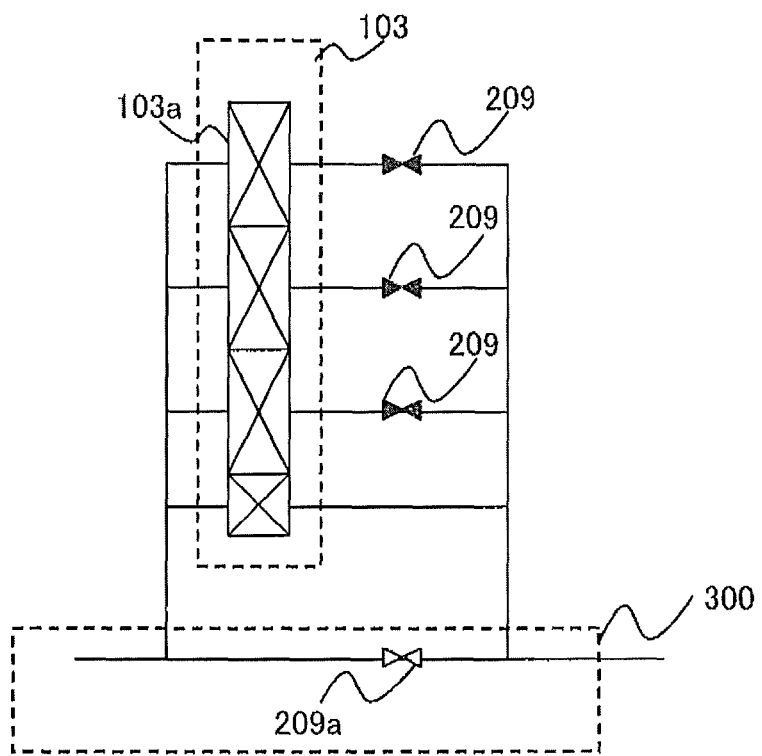
FIG. 3 is an illustrative drawing illustrating an example of the structure of an outdoor heat exchanger.

FIG. 3 is an illustrative drawing illustrating an example of the structure of an outdoor heat exchanger 103. Based on FIG. 3, the outdoor heat exchanger 103 will be explained which is made to be able to perform heating operation all through the year. When using the air-conditioning hot-water supply complex system 100 only for a general air-conditioning use, it is common to perform heating operation at the outside air wet-bulb temperature of 15° C. or less. However, in the hot-water supply operation, the hot-water supply operation has to be performed independent of the outside air temperature. Then, in FIG. 3, an example is shown in which the outdoor heat exchanger 103 adopts a block construction internally having a plurality of heat exchangers (hereinafter, referred to as a divided heat exchanger 103a). The outdoor heat exchanger 103 may be a block structure in which four heat exchangers are combined or a block structure in which one heat exchanger is divided into four.

As shown in FIG. 3, high-pressure side connection piping 106 is branched into a plural to be connected with each divided heat exchanger 103a constituting the outdoor heat exchanger 103 respectively. For each branched high-pressure side connection piping 106, an electromagnetic valve 209 is installed, which is an on-off valve subjected to an on-off control such that the valve does flow or does not flow the refrigerant. One of the high-pressure side connection piping 106 branched into the plural is made to be a bypass circuit 300 which bypasses the divided heat exchanger 103a. In the bypass circuit 300, the electromagnetic valve 209 is also installed, which is a bypass on-off valve. That is, the outdoor heat exchanger 103 constituting the refrigeration cycle for air-conditioning 1 can adjust an inflow refrigerant amount by controlling on-off of the electromagnetic valves 209 and 209a to make a capacity of the heat exchanger to be dividable.

When the outside air wet-bulb temperature increases, that is, the suction temperature of the compressor for air-conditioning 101 is likely to exceed an operation range (generally up to 15° C.), it is desirable that heat exchanger ability of the outdoor heat exchanger 103 be lowered. Then, in the air-conditioning hot-water supply complex system 100, all of or part of the electromagnetic valves 209 is closed to shut off the refrigerant flowing into the outdoor heat exchanger 103, so that the operation range of the compressor for air-conditioning 101 being not departed. That is, based on the operation range of the compressor for air-conditioning 101, the number of the divided heat exchanger 103a flowing the refrigerant is determined. By closing the electromagnetic valves 209 according to the number, the refrigerant inflow amount is adjusted, so that the operation range of the compressor for air-conditioning 101 being not departed.

However, even when the heat exchanger ability of the outdoor heat exchanger 103 is lowered by closing the electromagnetic valve 209, the operation range of the compressor for air-conditioning 101 is sometimes departed. In this case, it is desirable that the refrigerant be returned to the compressor for air-conditioning 101 instead of being made to flow into the outdoor heat exchanger 103. Then, the electromagnetic valve 209 installed in the bypass circuit 300 is opened and the refrigerant is adapted to be returned to the suction side of the compressor for air-conditioning 101 instead of being made to flow into the outdoor heat exchanger 103. Thus, an evaporation temperature is prevented from rising, and operation is possible without departing from the operation range of the compressor for air-conditioning 101.

The electromagnetic valve 209 installed in the bypass circuit 300 is selected to satisfy a formula Cva<CVb, where Cva is a flow coefficient of the refrigerant at the time of passing through the outdoor heat exchanger 103 and CVb is the flow coefficient of the refrigerant at the time of passing through the bypass circuit 300. Moreover, the operation range of the compressor for air-conditioning 101 cannot be maintained only by dividing the capacity of the heat exchanger, the operation range can be maintained by opening the electromagnetic valve 209a installed in the bypass circuit 300 to let the refrigerant bypass. The block structure may be a structure in which control is performed using an electronic expansion valve instead of the electromagnetic valve.

Figure 4:
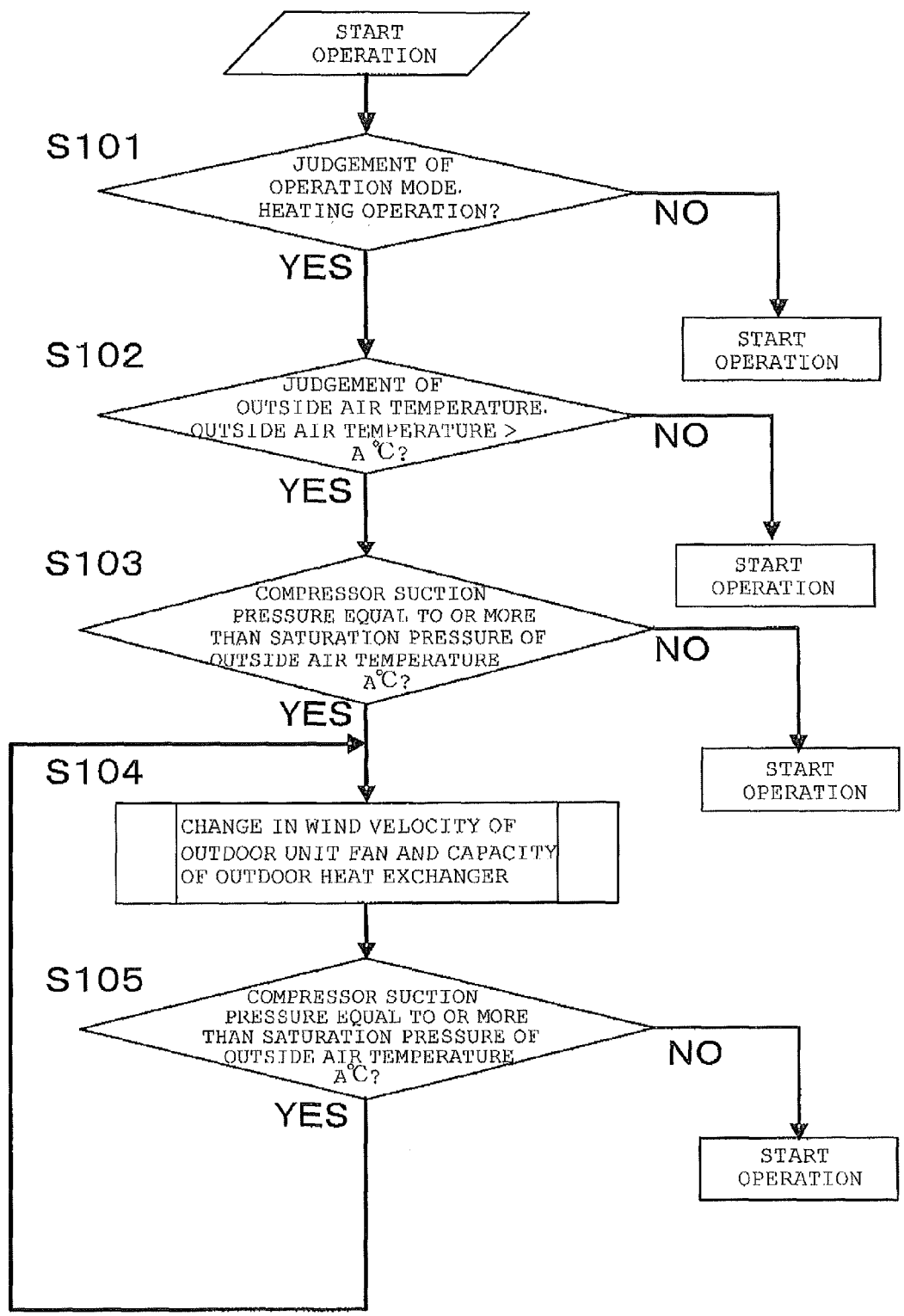
FIG. 4 is a flow chart showing a process flow when adjusting the operation range of a compressor for air-conditioning.

FIG. 4 is a flow chart showing a processing flow when adjusting the operation range of the compressor for air-conditioning 101. Based on FIG. 4, detailed descriptions will be given to processing that adjusts the operation range of the compressor for air-conditioning 101 explained in FIG. 3. As mentioned above, when using the air-conditioning hot-water supply complex system 100 for air-conditioning in general, no heating operation is required at a relatively higher outside air temperature (for example, 15° C. or above). In the case in which the outside wet-bulb temperature is from −20° C. to 15.5° C., heating operation is generally performed. However, when the air-conditioning hot-water supply complex system 100 performs the hot-water supply operation, the hot-water supply operation is required independent of the outside air temperature.

Firstly, when the air-conditioning hot-water supply complex system 100 starts operation, it is judged whether the current operation mode is the heating operation or not (step S101). Then, when the operation mode is the cooling operation (step S101: NO), the cooling operation is continued with no particular control because the operation range of the compressor for air-conditioning 101 is not departed. On the other hand, when the operation mode is the heating operation (step S101: YES), it is judged whether the outside air temperature is larger than a predetermined temperature A° C. (step S102). Then, the outside air temperature is below A° C. (step S102: NO), the heating operation is continued with no particular control because the operation range of the compressor for air-conditioning 101 is not departed.

On the other hand, the outside air temperature is larger than A° C. (step S102: YES), it is judged whether the pressure of the refrigerant sucked by the compressor for air-conditioning 101 is equal to or larger than a saturation pressure at a predetermined temperature A° C. (step S103). When the suction pressure is below the saturation pressure at A° C. (step S103: NO), the heating operation is continued with no particular control because the operation range of the compressor for air-conditioning 101 is not departed. To the contrary, when the suction pressure is equal to or larger than the saturation pressure at A° C. (step S103: YES), since the operation range of the compressor for air-conditioning 101 is likely to be departed, it is controlled such that the rotation speed of blast means such as a fan installed in the vicinity of the outdoor heat exchanger 103 is lowered and the number of the electromagnetic valve 209 to be closed is determined (step S104).

That is, by lowering the heat exchange ability of the outdoor heat exchanger 103, the operation range of the compressor for air-conditioning 101 is adjusted such that the suction pressure to the compressor for air-conditioning 101 does not exceed an allowable value. Then, it is judged again whether the suction pressure to the compressor for air-conditioning 101 is equal to or larger than the saturation pressure of the predetermined temperature A° C. (step S105). When the suction pressure becomes equal to or less than the saturation pressure (step S105: NO), since it is judged that the operation range of the compressor for air-conditioning 101 is not departed, the heating operation is continued with the blast means and the electromagnetic valve 209 being controlled. On the other hand, when the suction pressure is still equal to or larger than the saturation pressure (step S105: YES), since a possibility remains that the operation range of the compressor for air-conditioning 101 may be departed, control is performed such that the number of the electromagnetic valve 209 is increased (step S104), which makes the rotation speed of the blast means reduced and closed.

Under a normal operation, decision criterion for the predetermined temperature A ° C. is determined in general by the compressor for air-conditioning 101 for use. An ordinary compressor for air-conditioning 101 has a limit on the suction pressure and the discharge pressure. In the heating operation, the outdoor heat exchanger 103 usually operates as an evaporator. When the outdoor heat exchanger 103 operates as an evaporator, the suction pressure of the compressor for air-conditioning 101 becomes almost the same value as the saturation pressure calculated from the outside air wet-bulb temperature. The operation range of the compressor for air-conditioning 101 is judged with the outside temperature being the criterion, however, it may be judged based on the case in which blast means neighboring the outdoor heat exchanger 103 rotates at the smallest rotation speed for several minutes, and the case in which the compressor for air-conditioning 101 rotates at the smallest rotation speed for several minutes. Here, the several minute denotes an equivalent time with an outdoor unit control timing or an instant.

Judgment and control of each device based on the above flowchart are adapted to be executed by a controller, not shown, constituted by such as a microprocessor. The controller may be installed in any of the heat source A, the relay E, cooling indoor unit B, heating indoor unit C, and hot-water supply heat source circuit D. Low-pressure detection means such as a pressure sensor that detects a refrigerant pressure sucked by the compressor for air-conditioning 101 may be installed in the suction side piping connected with the compressor for air-conditioning 101. The number of the divided heat exchanger 103a constituting the outdoor heat exchanger 103, that is, the division number of the outdoor heat exchanger 103 is not limited in particular.

Embodiment 2

Figure 5:
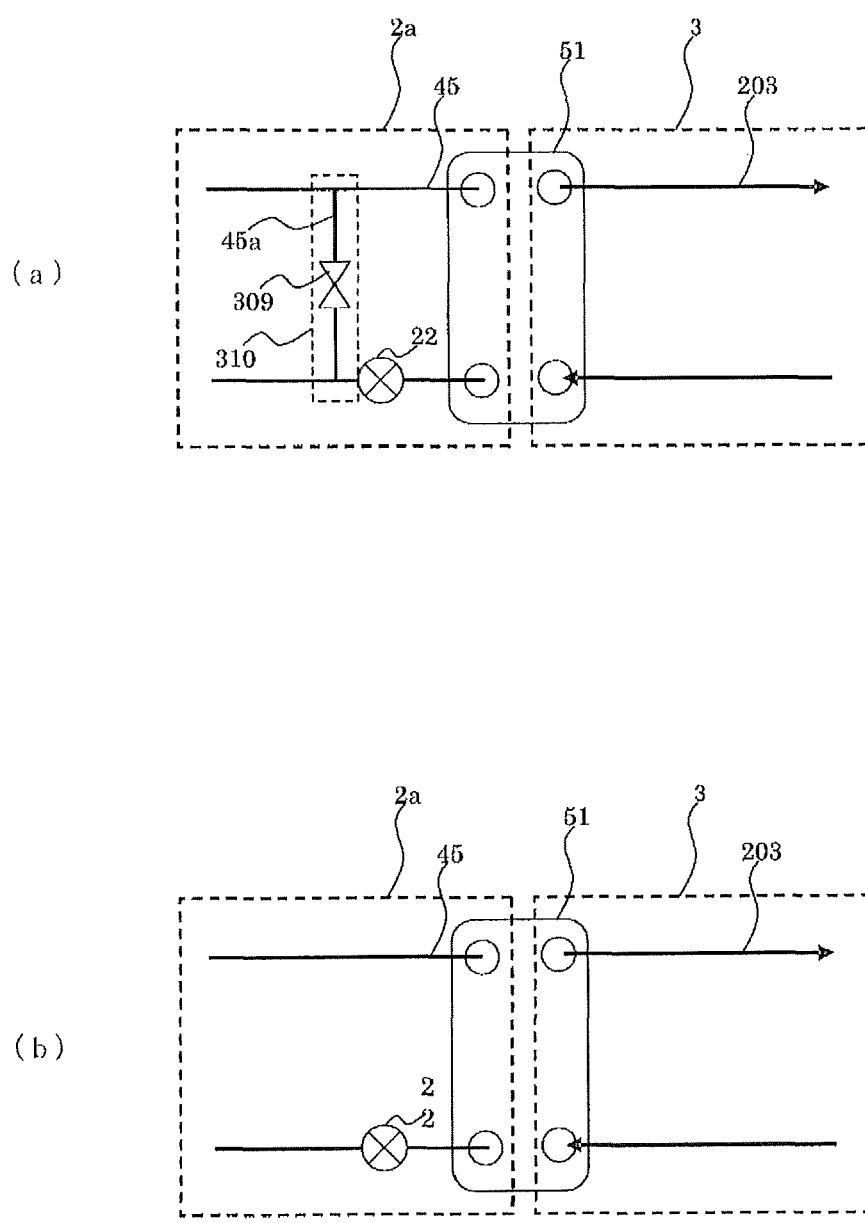
FIG. 5 is an illustrative drawing illustrating a refrigeration cycle for hot-water supply according to Embodiment 2.

FIG. 5 is an illustrative drawing illustrating a refrigeration cycle for hot-water supply 2a according to Embodiment 2. Based on FIG. 5, descriptions will be given to the refrigeration cycle for hot-water supply 2a, which is a feature item of Embodiment 2. FIG. 5(a) denotes a partially enlarged view of the refrigeration cycle for hot-water supply 2a, and FIG. 5(b) denotes a partially enlarged view of the refrigeration cycle for hot-water supply 2 as a comparison example, respectively. The refrigeration cycle for hot-water supply 2a is different from the refrigeration cycle for hot-water supply 2 in that the refrigerant piping 45 is branched between the compressor for hot-water supply 21 and the heating medium-refrigerant heat exchanger 51, and a bypass pipe 45a connected between the throttle means for hot-water supply 22 and the refrigerant-refrigerant heat exchanger 41 is provided to form the bypass circuit 310. In the bypass pipe 45a, the bypass electromagnetic valve 309 is installed.

As mentioned above, the heating medium-refrigerant heat exchanger 51 performs heat exchange between the refrigerant circulating the refrigeration cycle for hot-water supply 2 and the water circulating the hot-water supply load 3. In the heating operation of the air-conditioning hot-water supply complex system 100, an operation mode may be changed to a defrosting operation dependent on an outside air temperature. When the operation mode is changed into the defrosting operation, a low-pressure refrigerant of 0° C. or lower possibly flows into the heating medium-refrigerant heat exchanger 51a. Further, when the operation mode is changed into the defrosting operation, and a low-pressure refrigerant of 0° C. or lower flows into the heating medium-refrigerant heat exchanger 51 according to Embodiment 1, the water may resultantly freeze, which circulates the hot-water supply load 3 and retained in the heating medium-refrigerant heat exchanger 51.

Then, by adding the bypass pipe 45a to the refrigeration cycle for hot-water supply 2a, even when the operation mode is changed into the defrosting operation, the low-pressure refrigerant can be prevented from entering into the heating medium-refrigerant heat exchanger 51 by controlling the bypass electromagnetic valve 309 installed in the bypass pipe 45a from open to close. Therefore, during the defrosting operation, by flowing the low-pressure refrigerant into the bypass circuit 310, a stable heat source can be provided without giving an abrupt change in temperature at the hot-water supply load 3 side. By bypassing the low-pressure refrigerant in the bypass pipe 45a, water retained in the heating medium-refrigerant heat exchanger 51 can be prevented from freezing, so that damage to the heating medium-refrigerant heat exchanger 51 can be avoided. The low-pressure refrigerant may be bypassed using an electronic expansion valve or a mechanical expansion valve instead of the bypass electromagnetic valve 309.

Figure 6:
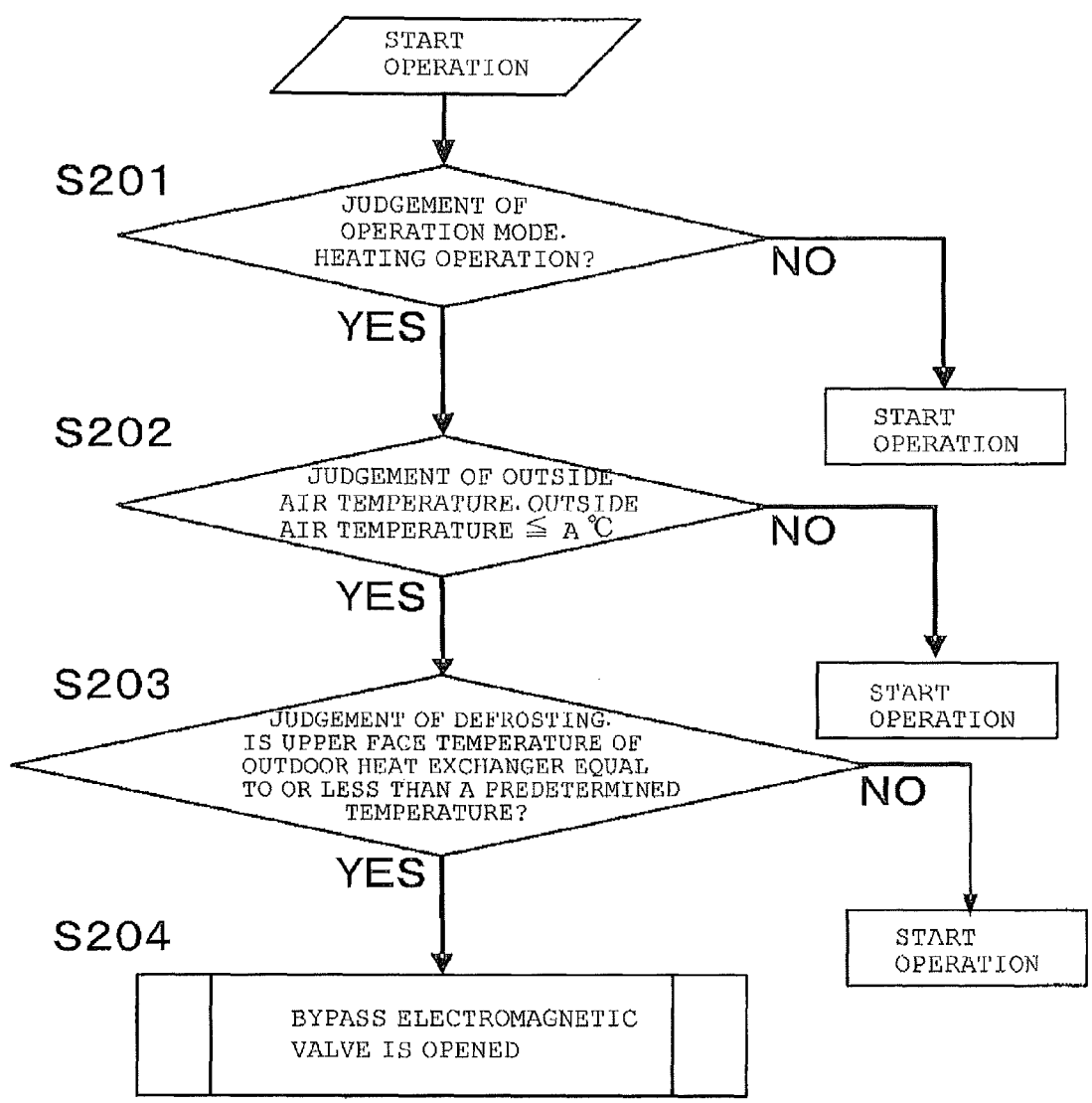
FIG. 6 is a flow chart showing a process flow when opening and closing a bypass electromagnetic valve.

FIG. 6 is a flow chart showing a processing flow when opening and closing the bypass electromagnetic valve 309. Based on FIG. 6, detailed descriptions will be given to processing at the time of making the refrigerant flow into the bypass pipe 45a by the on-off control of the bypass electromagnetic valve 309. As mentioned above, when heating operation is performed in the air-conditioning hot-water supply complex system 100, the operation mode may be sometimes changed to a defrosting operation dependent on an outside air temperature. Then, the air-conditioning hot-water supply complex system 100 can execute the defrosting operation by controlling the four-way valve 102 to make the refrigerant flow similar to that at the time of the cooling operation.

Firstly, when the air-conditioning hot-water supply complex system 100 starts operations, it is judged whether the current operation mode is the heating operation or not (step S201). Then, when the operation mode is the cooling operation (step S201: NO), the cooling operation is continued with the bypass electromagnetic valve 309 being closed because no defrosting operation and no refrigerant is required to flow into the bypass pipe 45a. On the other hand, when the operation mode is the heating operation (step S201: YES), it is judged whether the outside air temperature is equal to or less than a predetermined temperature A° C. (step S202). Then, when the outside air temperature is larger than A° C. (step S202: NO), the heating operation is continued with the bypass electromagnetic valve 309 being closed because no defrosting operation and no refrigerant is required to flow into the bypass pipe 45a.

On the other hand, when the outside air temperature is equal to or less than A° C. (step S202: YES), it is judged whether the defrosting operation is performed or not by whether the surface temperature of the outdoor heat exchanger 103 becomes equal to or less than the predetermined temperature (step S203). When no defrosting operation is required, that is, when the surface temperature of the outdoor heat exchanger 103 is higher than the predetermined temperature (step S203: NO), the heating operation is continued with the bypass electromagnetic valve 309 being closed because no refrigerant is required to flow into the bypass pipe 45a. To the contrary, when the defrosting operation is in need, that is, when the surface temperature of the outdoor heat exchanger 103 is equal to or less than the predetermined temperature (step S203: YES), the defrosting operation is performed and the refrigerant is made to flow in the bypass pipe 45a (step S204) with the bypass electromagnetic valve 309 being controlled to be open.

Judgment and control of each device based on the above flowchart are adapted to be executed by a controller like FIG. 4. Temperature detection means such as a temperature sensor that detects the surface temperature of the outdoor heat exchanger 103 may be installed on the surface and in the vicinity of the outdoor heat exchanger 103. The bypass electromagnetic valve 309 is not adapted to be open only when the defrosting operation starts. For example, when the refrigerant flow direction is reversed, and when the operation is switched from heating to cooling, since the low-temperature refrigerant flows into the heating medium-refrigerant heat exchanger 51, the refrigerant may be made to flow into the bypass pipe 45a with the bypass electromagnetic valve 309 being open. However, operation should be started after the refrigerant flow amount is adjusted so that an abrupt change in the refrigerant does not occur in the bypass pipe 45a.

Embodiment 3

FIG. 7 is an illustrative drawing illustrating piping for hot-water storage water circulation 203a according to Embodiment 3. FIG. 8 is a schematic diagram illustrating the height of a trap 210. Based on FIGS. 7 and 8, descriptions will be given to piping for hot-water storage water circulation 203a, which is a feature item of Embodiment 3. FIG. 7(a) denotes a partially enlarged view of the piping for hot-water storage water circulation 203a, and FIG. 7(b) a partially enlarged view of the piping for hot-water storage water circulation 203 as a comparison example, respectively. The piping for hot-water storage water circulation 203a is different from the piping for hot-water storage water circulation 203 in that it is installed so as to form the trap 210.

When constructing piping for hot-water storage water circulation 203 according to Embodiments 1 and 2, as shown in FIG. 7(b), it is common to directly connect piping at the water gateway of the heating medium-refrigerant heat exchanger 51. As a result, when flowing the fluid in the arrow direction, an air layer stays at the upper part of the heating medium-refrigerant heat exchanger 51. When the air layer stays at the upper part of the heating medium-refrigerant heat exchanger 51, a scale is attached to the portion, so that the life of the heating medium-refrigerant heat exchanger 51 is possibly shortened.

Then, the trap 210 is formed at the piping for hot-water storage water circulation 203a configuring the hot-water supply load 3 so as not to stay the air layer at the upper part of the heating medium-refrigerant heat exchanger 51. The trap 210 is formed by making part of the piping for hot-water storage water circulation 203a at the outlet side of the heating medium-refrigerant heat exchanger 51 higher by A mm than the piping for hot-water storage water circulation 203a at the inlet side of the heating medium-refrigerant heat exchanger 51. Thus, by forming the trap 210 in the piping for hot-water storage water circulation 203a, the air layer can be stayed in the trap 210, allowing no air layer to stay at the upper part of the heating medium-refrigerant heat exchanger 51.

As a result, when used in an environment containing a great deal of a hardening component, stay of air in the heating medium-refrigerant heat exchanger 51 and attachment of scale can be prevented in advance and the life of the heating medium-refrigerant heat exchanger 51 can be extended. The staying air in the trap 210 can be discharged outside by maximizing the flow amount of the water circulation pump 31. By adapting to discharge the air at once at the time of constructing piping, no air stays in the trap 210 and no scale is attached in the piping for hot-water storage water circulation 203a.

A structure is allowable which lets the air stayed in the trap 210 is released by providing such as an air vent valve at the formation part of the trap 210. As shown in FIG. 8, when the height of the trap 210 is made to be A (mm) and the height of the heating medium-refrigerant heat exchanger 13 (mm), the height A of the trap 210 is made to be 0 mm or more and equal to or less than the height B of the heating medium-refrigerant heat exchanger. However, when selecting the water circulation pump 31 considering the height A of the trap 210, the height A of the trap is not limited in particular.

The invention claimed is:

1. An air-conditioning hot-water supply complex system, comprising;
 a refrigeration cycle for air-conditioning having a first refrigerant circuit, in which a compressor for air-conditioning, flow path switching means, an outdoor heat exchanger, an indoor heat exchanger, and throttle means for air-conditioning are connected in series, in which a refrigerant-refrigerant heat exchanger and a throttle means for a hot-water supply heat source are connected in series and are connected with the indoor heat exchanger and the throttle means for air-conditioning in parallel, and in which a refrigerant for air-conditioning circulates;
 a refrigeration cycle for hot-water supply having a second refrigerant circuit, in which a compressor for hot-water supply, a heating medium-refrigerant heat exchanger, throttle means for hot-water supply, and the refrigerant-refrigerant heat exchanger are connected in series, and in which a refrigerant for hot-water supply circulates;
 a hot water supply load having a water circuit, in which a pump for water circulation, the heating medium-refrigerant heat exchanger, and a hot-water storage tank are connected in series, and in which water for hot-water supply circulates;
  wherein the refrigeration cycle for air-conditioning and the refrigeration cycle for hot-water supply are cascaded so that the refrigerant for air-conditioning and the refrigerant for hot-water supply performs heat exchange in the refrigerant-refrigerant heat exchanger,
  the refrigeration cycle for hot-water supply and the hot-water supply load are cascaded so that the refrigerant for hot-water supply and the water for hot-water supply perform heat exchange in the heating medium-refrigerant heat exchanger,
 a bypass pipe with a bypass electromagnetic valve is provided in parallel with the heating medium-refrigerant heat exchanger between a gateway of refrigerant piping connected with the heating medium-refrigerant heat exchanger,
 when a surface temperature of the outdoor heat exchanger is equal to or less than a temperature set so as to perform a defrosting operation, the bypass electromagnetic valve is made to be open and the refrigerant for hot-water supply is made to flow into the bypass pipe, and
 part of a piping for hot-water storage water circulation for flowing water for the hot-water supply, at an outlet side of the heating medium—refrigerant heat exchanger is made to be higher than the piping for hot-water storage water circulation at the inlet side of the heating medium—refrigerant heat exchanger for operating as a trap wherein an outlet of the heating medium-refrigerant heat exchanger is lower than an inlet of the heating medium-refrigerant heat exchanger.

2. The air-conditioning hot-water supply complex system of claim 1, comprising a hot-water supply heating medium circulation cycle having a heating medium circuit, in which a heating medium circulation pump, the heating medium-refrigerant heat exchanger, and a heating medium-heating medium heat exchanger are connected in series between the refrigeration cycle for hot-water supply and the hot-water supply load, and in which a heating medium for heating circulates,
 wherein, the refrigeration cycle for hot-water supply and hot-water supply heating medium circulation cycle are cascaded so that the refrigerant for hot-water supply and the heating medium perform heat exchange in the heating medium-refrigerant heat exchanger, and
 the hot-water supply heating medium circulation cycle and the hot-water supply load are cascaded so that the heating medium and the water for hot-water supply perform heat exchange in the heating medium-heating medium heat exchanger.

3. The air-conditioning hot-water supply complex system of claim 1, wherein the refrigerant for hot-water supply is a refrigerant whose critical temperature is equal to or larger than 60° C.

* * * * *